Jan. 20, 1942.  H. H. BIXLER  2,270,751
VALVE ASSEMBLY
Filed June 16, 1939

Inventor:
Harley H. Bixler,
by Harry E. Dunham
His Attorney.

Patented Jan. 20, 1942

2,270,751

UNITED STATES PATENT OFFICE 2,270,751

VALVE ASSEMBLY

Harley H. Bixler, Schenectady, N. Y., assignor to General Electric Company, a corporation of New York Application June 16, 1939, Serial No. 279,498

2 Claims. (Cl. 230—231)

My invention relates to a valve assembly and more particularly to a valve assembly for reciprocating fluid compressors.

The objects and advantages of my invention will become apparent as the following description proceeds, and the features of novelty which characterize my invention will be pointed out with particularity in the claims annexed to and forming a part of this specification.

Figure 1:
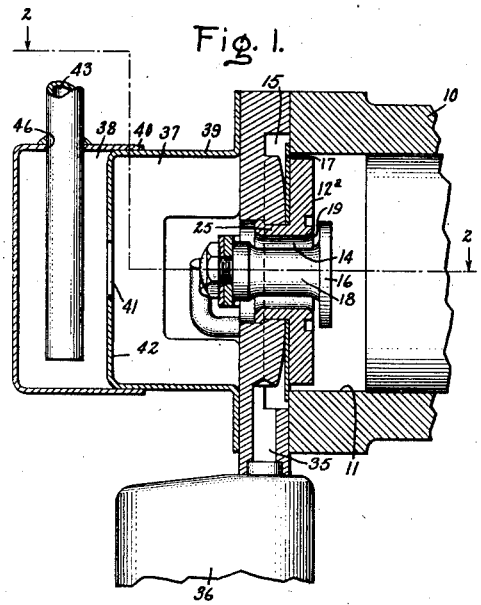
Figure 2:
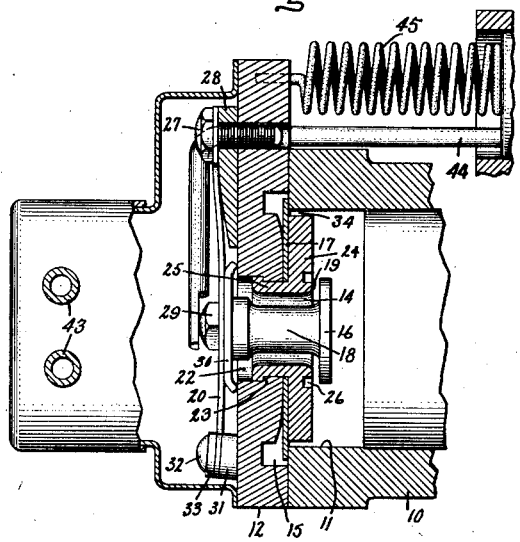
Figure 3:
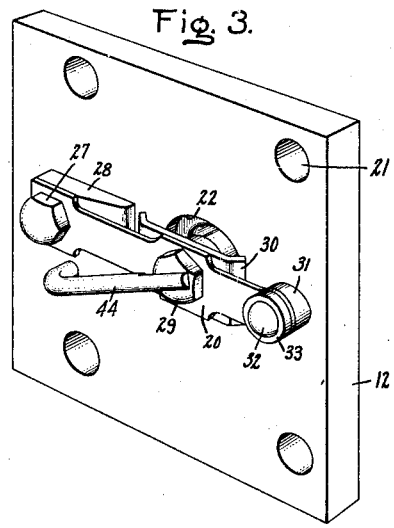

For a better understanding of my invention, reference may be had to the accompanying drawing in which Fig. 1 is a fragmentary sectional view of a valve assembly incorporating my invention; Fig. 2 is a fragmentary view of the invention disclosed in Fig. 1, taken along the line 2—2 of Fig. 1; and Fig. 3 is an enlarged perspective view of the valve assembly disclosed in Figs. 1 and 2.

Referring to the drawing I have shown a valve assembly constructed according to my invention applied to one end of a cylinder block 10 of a compressor. Inasmuch as the details of the compressor form no part of the present invention it is believed unnecessary to fully illustrate the compressor. One end of the bore 11 of the cylinder block 10 is substantially closed by a body 12a including a valve plate 12. The valve plate 12 is provided with an inlet port 14 and an exhaust passageway 15, the flow of working fluid through these passageways or ports being controlled by a closure including an intake valve 16 and an exhaust valve 17, respectively. In order to support the intake valve 16 in position to close the port 14 I have provided a stem 18, one end of which is secured to the valve 16, the other end extending through the port. On the outer surface of the valve plate 12, that is, the side which is remote from the cylinder and the valve seat 19 and intake valve 16, I have provided a spring 20 to which the projecting end of the stem 18 is suitably secured. By means of spring 20 the intake valve 16 is resiliently biased in a direction to maintain the port 14 closed to the flow of the working fluid. In order to provide an intake passage for the fluid to be compressed, the stem 18 is constructed with a smaller diameter than that of the bore 14 whereby the surface of the stem is at all times out of contact with the walls of the bore or port. This construction avoids friction between the stem and the bore 14 and consequent wear of the stem. Thus, the spring or resilient means 20 not only serves to bias the valve 16 to its closed position but also provides the sole means for guiding and locating the stem and the valve.

Describing my invention in greater detail, I have illustrated a compressor having a cylinder block 10 provided with a cylinder bore 11 and a piston adapted for reciprocation within the cylinder bore 11 in any suitable manner not shown. One end of the bore 11 is closed by the body 12a as described above, the valve plate 12 being secured to the cylinder block 10 in any suitable manner as by means of bolts for example, passing through the openings 21 in the plate 12.

The valve plate 12 is provided with a relatively large opening 22 therethrough. The opening 22 is counterbored thereby providing a shoulder 23. In order to provide a valve seat for an intake valve I have provided a member 24 on the side of the valve plate 12 which is presented to the cylinder bore 11 of the compressor. The member 24 is provided with an aperture 14 therethrough and a laterally extending collar 25 which during assembly of the valve is rolled at the outer edge thereof over the shoulder 23 of the plate 12. The aperture 14 is substantially centrally located with respect to the cylinder bore 11. One face of the member 24 is provided with a substantially annular groove 26 concentrically located with respect to the bore 14 in order to provide a valve seat 19 for the intake valve 16.

The intake valve 16 is supported from a resilient member or spring 20 by means of a stem 18. As best shown in Fig. 3, the spring 20 in the illustrated embodiment of my invention is in the form of a relatively narrow leaf spring secured at one end to the valve plate 12 in any suitable manner as, for example, by means of a threaded bolt 27 engaging a suitably threaded opening in the plate 12. In order to equalize the bending stress in that portion of the spring 20 adjacent the clamping end thereof and to support the spring in spaced-apart relationship with respect to the valve plate, I have provided a guide 28 interposed between the spring 20 and the valve plate 12. As illustrated, the guide 28 may be maintained in position by means of the bolt 27. The end of the stem 18 opposite the intake valve 16 is secured to the spring 20 as by means of a bolt 29. In order to limit the opening movement of the intake valve 16 I have provided a stop 30 interposed between the spring 20 and the stem 18. In the illustrated form the stop 30 is provided with an opening through which the securing bolt 29 is arranged to pass and the ends of the stop 30 are bent as shown in order to engage the plate 12 adjacent the opening 22. The free end of the spring 20 is provided with a spacer 31 suitably secured as by means of a threaded bolt 32 and a washer 33. The spacer 31 serves to engage the remote side of the valve plate in order to cooperate with the support means or guide 28 to maintain the spring in substantial parallelism with the outer surface of the valve plate and also out of contact with the valve plate 12. Furthermore, the provision of the spacer 31 establishes two points of support for the spring 20 and by supporting the intake valve 16 intermediate the ends of the spring 20, as illustrated, the maximum resiliency of the spring 20 is realized.

In order to provide an exhaust passageway, the member 24 is provided with a perimeter slightly less than that of the cylinder bore 11 in order to provide a passage 34 between the edge of the member 24 and the wall of the cylinder bore 11. This opening or passageway 34 is closed during the intake stroke of the compressor by the exhaust valve 17 which is clamped in position in any suitable manner. In the illustrated form of my invention the valve 17 is clamped between the valve plate 12 and the member 24 during assembly of the valve structure. The under surface of valve plate 12 is provided with a substantially annular passageway or groove 15 which communicates with passage 34 when the exhaust valve 17 is in its open position. The surface of that portion of valve plate 12 between passage or groove 15 and the opening 22 is curved or tapered as shown in order to distribute the stress in the disk type exhaust valve 17 throughout the area of the valve. The valve plate 12 is also provided with a substantially radial passageway 35 communicating between the groove 15 and the edge of valve plate 12, the passageway 35 leading to an exhaust muffler 36.

An intake muffler is illustrated together with the valve assembly and comprises two expansion chambers 37 and 38. The first-mentioned chamber is defined by a suitably formed shell 39 suitably secured to the valve plate 12 as by means of bolts not shown. A shell 40 overlapping the shell 39 may be used in order to provide the second expansion chamber 38, as illustrated in Fig. 1. The shell 40 is suitably secured to the shell 39 as by means of welding. An aperture 41 is provided in the wall 42 of the inner chamber 37 in order to provide communication between the two chambers 37 and 38. The fluid to be compressed enters the chamber 38 through inlet conduits 43 which pass through suitable openings 46 in the wall of the shell 40 and are suitably sealed at the point of passage through the shell 40 as by welding in order to prevent leakage. While I have illustrated the use of two conduits 43 it will be understood that any number of inlet passages may be provided.

I have illustrated the use of an unloader mechanism for controlling the loading and unloading of the compressor. This unloader mechanism forms no part of the present invention but is shown, described and claimed in U. S. Letters Patent 2,102,403 to Harley H. Bixler and assigned to the same assignee as the present invention. It is believed to be sufficient to state that the unloader includes an operating arm 44 which is normally biased by means of a helical compression spring 45 to a position in which it holds the inlet valve 16 in the open position thus unloading the compressor. The unloader is so arranged that when the pressure of the lubricant in the lubricant circulating system is sufficiently great, the operating rod will be moved against the force of the spring 45 in order to permit the valve 16 to move to its closed position.

The operation of the illustrated apparatus will now be described. In the drawing the parts are illustrated in the position assumed when the compressor is shut down so that the unloader mechanism is holding open the intake valve 16. When the compressor unit is put into operation and the lubricant pressure in the lubricant circulating system builds up, the operating arm 44 will move to the left as viewed in Fig. 2 thereby releasing the intake valve 16 which will move to its closed position under the influence of spring 20. Thereafter, during the intake stroke of the piston 12, the pressure to the left of the intake valve 16 will be greater than the pressure existing within the cylinder bore 11 and when this pressure difference becomes sufficiently great the valve 16 will be moved to the right away from the valve seat 19 in opposition to the spring 20 permitting the working fluid to be compressed to pass through the port 14 into the cylinder bore 11. At the end of the intake stroke of the piston 12 the pressures on opposite sides of the valves 16 will equalize so that the spring 20 will cause the valve 16 to move to its closed position. The increase of pressure within the cylinder bore 11 during the exhaust stroke will finally cause the exhaust valve 16 to unseat whereby the compressed fluid will pass through the passage 34 around the edge of valve 16 into the groove 15 and finally into the exhaust muffler 36 by way of passage 35.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In a valve assembly for a working fluid compressor cylinder of the type including a valve plate having a port therethrough for the passage of a working fluid, a valve seat surrounding said port and disposed on the side of said plate presented toward said cylinder, means for closing said port including a valve arranged to seat on said valve seat, a valve stem, one end of said stem being secured to said valve, the other end of said stem extending through said port but out of contact therewith, and means for urging said stem and said valve in a direction to maintain said port closed, said means including an elongated relatively flat spring located on the side of said plate remote from the cylinder and secured intermediate its ends to said stem on the remote side of said plate, means for supporting and securing said spring at one end on said plate in spaced relation thereto, and means at the other end of said spring for maintaining said spring in substantially parallel spaced relation with respect to said remote side of said plate in the closed position of said valve, and means held between the stem and said spring intermediate the ends thereof for engaging said remote side of said plate after a predetermined movement of said valve in the valve opening direction, thereby limiting said movement of said valve spring.

2. In a valve assembly for a fluid compressor cylinder, a valve plate arranged at one end of the cylinder bore, said plate being provided with an aperture extending therethrough substantially centrally of said cylinder bore, a member adjacent said plate on the side thereof presented to said cylinder bore, said member having an aperture substantially centrally located, said apertures being aligned to provide a port, said member also having a valve seat surrounding said aperture, a valve arranged to seat on said valve seat, a stem extending through said port but out of contact therewith, one end of said stem being secured to said valve, an elongated leaf spring supported on the outer surface of said valve plate, one end thereof being supported on said plate, a member engaging the other end of said spring for spacing said spring on said plate, the end of said stem which projects through said port being secured to said spring intermediate the ends thereof, and means associated with the projecting end of said stem and said spring intermediate the ends thereof for engaging the outer surface of said plate after a predetermined movement of said valve in the valve opening direction to limit said movement of said valve and spring.

HARLEY H. BIXLER.